(12) United States Patent
Muralikrishna et al.

(10) Patent No.: US 7,037,537 B2
(45) Date of Patent: May 2, 2006

(54) EFFICIENT PROCESS OF OBTAINING HIGH CONTENTS OF BOUND-PHENOLIC ACID RICH DIETARY FIBRE BY ACTIVATING IN SITU AMYLASES THROUGH STEP-WISE INCREASE IN TEMPERATURE

(75) Inventors: Gudipati Muralikrishna, Karnataka (IN); Rayee Shyama Prasad Rao, Karnataka (IN)

(73) Assignee: Council of Scientific and Industrial Research, New Delhi (IN)

(*) Notice: Subject to any disclaimer, the term of this patent is extended or adjusted under 35 U.S.C. 154(b) by 611 days.

(21) Appl. No.: 10/382,335

(22) Filed: Mar. 5, 2003

(65) Prior Publication Data

US 2003/0185936 A1 Oct. 2, 2003

Related U.S. Application Data

(60) Provisional application No. 60/368,321, filed on Mar. 27, 2002.

(51) Int. Cl.
*A23L 1/105* (2006.01)
(52) U.S. Cl. .......................... 426/28; 426/18
(58) Field of Classification Search .................. 426/28, 426/18, 31, 49, 64, 615, 618, 431, 436, 425, 426/93; 424/489
See application file for complete search history.

(56) References Cited

U.S. PATENT DOCUMENTS

| | | | | |
|---|---|---|---|---|
| 3,249,512 A | * | 5/1966 | Bode | 435/96 |
| 3,647,473 A | * | 3/1972 | Stowell et al. | 426/29 |
| 4,619,831 A | * | 10/1986 | Sharma | 426/93 |
| 4,765,994 A | * | 8/1988 | Holmgren | 426/31 |
| 6,482,430 B1 | * | 11/2002 | Weightman et al. | 424/441 |

OTHER PUBLICATIONS

Journal of Science of Food and Agriculture, vol. 79 (1999) No. 3, pp. 355-490.*
Food Chemistry, vol. 72 (2001), pp. 187-192.*
Journal of Agric. Food Chem., Feb. 2002.*
Food chemistry, vol. 57 (1996) No. 1, pp. 15-21.*
Food Rev. Int., vol. 13 (1997), pp. 29-76.*
Dietary Fiber Analysis and Applications by Sungsoo Cho, Jonathan Devries and Leon Prosky, 1997 pp. 77-93 and 113-115.*

* cited by examiner

Primary Examiner—Steve Weinstein
Assistant Examiner—Jyoti Chawla
(74) Attorney, Agent, or Firm—Holland & Hart LLP

(57) ABSTRACT

A fast, effective, and economical process of obtaining high contents of bound-phenolic acid rich dietary fibre from cereal malts in time duration ranging between 36–48 hours by step-wise increase in temperature by about 8–12° C. for every 10–14 hours of incubation, thereby activating in situ amylases, with net temperature during incubation ranging between 43–77° C., with said stepwise increase in temperature helping to overcome the need of using exogenous enzymes.

10 Claims, No Drawings

EFFICIENT PROCESS OF OBTAINING HIGH CONTENTS OF BOUND-PHENOLIC ACID RICH DIETARY FIBRE BY ACTIVATING IN SITU AMYLASES THROUGH STEP-WISE INCREASE IN TEMPERATURE

This application claims priority to U.S. Provisional Patent Application No. 60/368, 321, titled AN IMPROVED PROCESS FOR OBTAINING BOUND-PHENOLIC ACID RICH DIETARY FIBRES, filed Mar. 27, 2002.

FIELD OF THE INVENTION

A fast, effective, and economical process of obtaining high contents of bound-phenolic acid rich dietary fibre from cereal malts in time duration ranging between 36–48 hours by step-wise increase in temperature by about 8–12° C. for every 10–14 hours of incubation, thereby activating in situ amylases, with net temperature during incubation ranging between 43–77° C., with said stepwise increase in temperature helps overcome the need of using exogenous enzymes.

BACKGROUND OF THE INVENTION

Phenolic acids such as ferulic and coumaric acids are covalently linked to mainly dietary fibre components such as arabinoxylans and pectins and influence their physicochemical properties in various food preparations. Besides acting as flavour compounds, phenolic acids are known to be possessing anticarcinogenic, antimutagenic, and antioxidant properties and hence their presence in dietary fibre components is very important for preparing health, geriatric and infant foods based on cereals. Phenolic acids are also present as free acids in very small amounts both in the cereals as well as malts. However, they undergo decarboxylation, in the process decreasing their utility value. Hence the bound phenolic acid content is very important for the positive health benefits of dietary fibre components.

For phenolic acids' chemistry, biochemistry and biotechnology the following articles can be referred.

- Journal of the Science of Food and Agriculture, Vol. 79 (1999) No. 3, pp 355–490.
- Non-starchy polysaccharide and bound phenolic acids from native and malted finger millet (Ragi, *Eleusine coracana,* Indaf-15), M. V. S. S. T. Subba Rao and G. Muralikrishna, Food Chemistry, Vol. 72 (2001) 187–192.
- Evaluation of the antioxidant properties of free and bound phenolic acids from native and malted finger millet (Ragi, *Eleusine coracana,* Indaf-15), M. V. S. S. T. Subba Rao and G. Muralikrishna, J. Agric. Food. Chem., February 2002.

Removal of starch by specific enzymatic treatments is a prerequisite step to prepare phenolic acid rich dietary fibre components from cereals and their malts. For preparing dietary fibres from cereals and their malts following reviewing articles can be referred.

- Food Chemistry, Vol. 57 (1996) No. 1, pp 15–21.
- Food Rev. Int., Vol. 13 (1997) pp 29–76.

In the existing process enzymes from bacteria (Termamyl, thermostable enzyme) and fungi (*Aspergillus niger,* glucoamylase) are used to remove starch.

Bacterial α-amylase is a thermostable enzyme and it degrades starch in to dextrins at boiling temperature (~98° C.), which in turn are converted in to glucose by glucoamylase at 55° C. This procedure is a long drawn one, which involves high temperature treatment and enzyme cost.

OBJECTS OF THE PRESENT INVENTION

The main object of the present invention is to develop an improved process of obtaining bound-phenolic acid rich dietary fibre.

Another main object of the present invention is to develop an improved process of obtaining bound-phenolic acid rich dietary fibre from cereal malts.

Yet another object of the present invention is to obtain bound-phenolic acid rich dietary fibre from cereal malts using in situ enzymes.

Still another object of the present invention is to obtain bound-phenolic acid rich dietary fibre from cereal malts by step-wise increase in the temperature, and thereby activating in situ enzyme amylase.

Still another object of the present invention is to develop a faster process of obtaining bound-phenolic acid rich dietary fibre from cereal malts.

Still another object of the present invention is to develop an economical process of obtaining bound-phenolic acid rich dietary fibre from cereal malts.

Still another object of the present inventions to obtain bound-phenolic acid without raising temperature beyond 80° C.

Still another object of the present invention is to develop an economical process for obtaining bound-phenolic acid.

Still another object of the present invention is to fully recover bound-phenolic acid from the cereal malts without any loss during the process.

Still another object of the present invention is to develop a faster process of obtaining bound-phenolic acid by retaining of all the bound phenolic acids present in the cereal malts unlike in the case of endosperm and bran where in only partial recovery of bound phenolic acid is achieved.

SUMMARY OF THE PRESENT INVENTION

A fast, effective, and economical process of obtaining high contents of bound-phenolic acid rich dietary fibre from cereal malts in time duration ranging between 36–48 hours by step-wise increase in temperature by about 8–12° C. for every 10–14 hours of incubation, thereby activating in situ amylases, with net temperature during incubation ranging between 43–77° C., with said stepwise increase in temperature helps overcome the need of using exogenous enzymes.

DETAILED DESCRIPTION

Accordingly, the present invention relates to a fast, effective, and economical process of obtaining high contents of bound-phenolic acid rich dietary fibre from cereal malts in time duration ranging between 36–48 hours by step-wise increase in temperature by about 8–12° C. for every 10–14 hours of incubation, thereby activating in situ amylases, with net temperature during incubation ranging between 43–77° C., said process comprising steps of:

adding about 7–15 gm % (w/v) of cereal malt in about 40–60 mM of acetate buffer of pH ranging between 4.8–5.2 to obtain malt solution,
  (a) incubating malt solution at about 45° C. for about 10–14 hours,
  (b) incubating malt solution of step (b) further at about 55° C. for another about 10–14 hours, (c) incubating malt solution of step (c) further at about 65° C. for another about 10–14 hours,
(d) incubating malt solution of step (d) further at about 75° C. for another about 10–14 hours to obtain a residue,
(e) centrifuging said residue at about 4500–5500 rpm for time duration ranging between 1–30 minutes,
(f) washing the centrifuged residue with water,
(g) drying the washed residue with ethanol,
(h) obtaining bound-phenolic acid rich dietary fibres.

In still another embodiment of the present invention, wherein said process eliminates the need for exogenous enzymes.

In still another embodiment of the present invention, wherein concentration of cereal malt in acetate buffer is about 10 gm % (w/v).

In still another embodiment of the present invention, wherein pH of the acetate buffer is about 5.0.

In still another embodiment of the present invention, wherein concentration of the acetate buffer is about 50 mM.

In still another embodiment of the present invention, wherein the cereal malts are selected from a group comprising rice malt, maize malt, wheat malt, and ragi malt.

In still another embodiment of the present invention, wherein the concentration of ethanol is ranging between 40 to 100%.

In still another embodiment of the present invention, wherein the stepwise increase in temperature helps overcome the need of using exogenous enzymes.

In still another embodiment of the present invention, wherein incubating the said mixture in an oven.

In still another embodiment of the present invention, wherein said process increases the nutrient value of the cereal malts.

In still another embodiment of the present invention, wherein said process eliminates starch from cereal malts comprising rice malt, maize malt, and wheat malt within about 21–39 hours.

In still another embodiment of the present invention, wherein said process eliminates starch at a maximum of about 65° C. from cereal malts comprising rice malt, maize malt, and wheat malt.

In still another embodiment of the present invention, wherein said process eliminates starch from ragi malt within about 35–45 hours.

In still another embodiment of the present invention, wherein said process eliminates starch at a maximum of about 75° C. from ragi malt.

In still another embodiment of the present invention, wherein said process removes starch form cereal malt at a much faster rate as compared to conventional processes.

In still another embodiment of the present invention, wherein said process is economical as compared to conventional processes.

In still another embodiment of the present invention, wherein centrifuging the residue at 5000 rpm for 1–30 minutes.

In still another embodiment of the present invention, wherein the concentration of ethanol is ranging between 40 to 100%.

In still another embodiment of the present invention, wherein the stepwise increase in temperature helps overcome the need of using exogenous enzymes.

In still another embodiment of the present invention, wherein incubating the said mixture in an oven.

In still another embodiment of the present invention, wherein starch levels are measured by iodine test.

In still another embodiment of the present invention, wherein washing the centrifuged residue in water.

In further embodiment of the present invention, the improved process is faster than the conventional processes because in the conventional processes, the exogenous enzymes from bacteria and fungi are added and temperature is to raised to as high as about 100° C. to obtain bound-phenolic acid rich dietary fibres from cereal malts. It is a very long drawn process with average results.

In further embodiment of the present invention, the instant improved process is economical as compared to conventional processes because of the non-requirement of the expensive commercially available enzymes.

In further embodiment of the present invention, the applicants have put in their expertise to understand the possibility of improving the process by correlating the temperature with increased isolation of bound-phenolic acid rich dietary fibres from cereal malts.

In further embodiment of the present invention, the applicants have come out with an improved process wherein increase in the temperature in a unique manner brings about significant increase in the levels of bound-phenolic acid rich dietary fibres from cereal malts.

In further embodiment of the present invention, the changes in the incubation temperature have been designed in a particular manner wherein said incubation temperature is increased by about 10° C. after about every 12 hours. This particular manner of variation in temperature and duration of incubation leads to significant improvement in the results.

In further embodiment of the present invention, the said variations in the process parameters like temperature and incubation time period brings about activation of in situ amylases. This triggers the increased isolation of bound-phenolic acid rich dietary fibres from cereal malts.

In further embodiment of the present invention, the said variations in the process lead to lesser conversion of bound-phenolic into unbound phenolic acids dietary fibres from cereal malts. This increases the nutrient value of the cereal malt.

In further embodiment of the present invention, developing a faster process of obtaining bound-phenolic acid by retaining of all the bound phenolic acids present in the cereal malts unlike in the case of endosperm and bran where in only partial recovery of bound phenolic acid is achieved.

The present investigation deals with an alternative process for isolation of bound-phenolic acid rich dietary fibres from cereal malts. Compared to the already existing processes, the present process has an advantage, since it eliminates the usage/addition of exogenous enzymes.

The present invention relates to an improved process of obtaining bound-phenolic acid rich dietary fibre from cereal malts by step-wise increase of about 7–14° C. in temperature and thereby using in situ amylases only.

In an embodiment of the present invention, the novelty in the present process is to exploit the malt/use of in situ enzymes to prepare fibre rich components without making use of bacterial amylase as well as glucoamylase. The steps of the improved process of instant Application are as follows:

a) Weighing cereal malts (rice, maize, wheat and ragi) 1 g each and taking in 10 ml of acetate buffer (pH 5.0, 50 mM).
b) Incubation of the cereal malts at about 45° C. for about 12 h.
c) Incubation of the cereal malts at about 55° C. for about 12 h.

d) Incubation of the cereal malts at about 65° C. for about 12 h.
e) Incubation of the cereal malts at about 75° C. for about 12 h.
f) Testing the aliquots for starch at each time interval.
g) Centrifugation at 5000 rpm.
h) Washing the residue and drying with graded ethanol (50%, 70% and 90%) and ethanol.
i) Quantification of bound phenolic acids by standard procedure.

In another embodiment of the present invention, step-by-step increase in temperature in order to degrade the malt starch by the enzymes present in the malt itself, avoiding the addition of exogenous enzymes.

EXAMPLES

The following examples are given by way of illustration of the present investigation and should not be construed to be limiting in any possible manner.

Example 1

Rice malt (1 g) was dispersed in 10 ml of 0.05 M acetate buffer (pH 5.0) and kept in an oven at 45° C. for 12 h. The temperature of the oven is raised by 10° C. for every 12 hours (55° C.—12 h, 65° C.—12 h and 75° C.—12 h) and aliquots (1 ml) were withdrawn every 12 h and tested for the presence of starch by iodine reagent. At 65° C. after 12 h (overall 36 h) of incubation the resultant malt gave a negative colour for starch indicating the action of in situ amylases of malt on the starch, producing dextrins.

Example 2

Maize malt (1 g) was dispersed in 10 ml of 0.05 M acetate buffer (pH 5.0) and kept in an oven at 45° C. for 12 h. The temperature of the oven is raised by 10° C. for every 12 hours (55° C.—12 h, 65° C.—12 h and 75° C.—12 h) and aliquots (1 ml) were withdrawn every 12 h and tested for the presence of starch by iodine reagent. At 65° C. after 12 h (overall 36 h) of incubation the resultant malt gave a negative colour for starch indicating the action of in situ amylases of malt on the starch, producing dextrins.

Example 3

Wheat malt (1 g) was dispersed in 10 ml of 0.05 M acetate buffer (pH 5.0) and kept in an oven at 45° C. for 12 h. The temperature of the oven is raised by 10° C. for every 12 hours (55° C.—12 h, 65° C.—12 h and 75° C.—12 h) and aliquots (1 ml) were withdrawn every 12 h and tested for the presence of starch by iodine reagent. At 65° C. after 12 h (overall 36 h) of incubation the resultant malt gave a negative colour for starch indicating the action of in situ amylases of malt on the starch, producing dextrins.

Example 4

Ragi malt (1 g) was dispersed in 10 ml of 0.05 M acetate buffer (pH 5.0) and kept in an oven at 45° C. for 12 h. The temperature of the oven is raised by 10° C. for every 12 hours (55° C.—12 h, 65° C.—12 h and 75° C.—12 h) and aliquots (1 ml) were withdrawn every 12 h and tested for the presence of starch by iodine reagent. At 75° C. after 4 h (overall 40 h) of incubation the resultant malt gave a negative colour for starch indicating the action of in situ amylases of malt on the starch, producing dextrins.

We claim:

1. A fast, effective, and economical process of obtaining high contents of bound-phenolic acid rich dietary fibre from cereal malts in time duration ranging between 36–48 hours by step-wise increase in temperature by about 8–12° C. for every 10–14 hours of incubation, thereby activating in situ amylases, with net temperature during incubation ranging between 43–77° C., said process comprising steps of:
   a. adding about 7–15 gm % (w/v) of cereal malt in about 40–60 mM of acetate buffer of pH ranging between 4.8–5.2 to obtain malt solution,
   b. incubating malt solution at about 45° C. for about 10–14 hours,
   c. incubating malt solution of step (b) further at about 55° C. for another about 10–14 hours,
   d. incubating malt solution of step (c) further at about 65° C. for another about 10–14 hours,
   e. incubating malt solution of step (d) further at about 75° C. for another about 10–14 hours to obtain a residue,
   f. centrifuging said residue at about 4500–5500 rpm for time duration ranging between 1–30 minutes,
   g. washing the centrifuged residue with water,
   h. drying the washed residue with ethanol, and
   i. obtaining bound-phenolic acid rich dietary fibres.

2. A process as claimed in claim 1, wherein said process eliminates the need for exogenous enzymes.

3. A process as claimed in claim 1, wherein concentration of cereal malt in acetate buffer is about 10 gm % (w/v).

4. A process as claimed in claim 1, wherein pH of the acetate buffer is about 5.0.

5. A process as claimed in claim 1, wherein concentration of the acetate buffer is about 50 mM.

6. A process as claimed in claim 1, wherein the cereal malts are selected from a group comprising rice malt, maize malt, wheat malt, and ragi malt.

7. An improved process as claimed in claim 1, wherein the concentration of ethanol is ranging between 40 to 100%.

8. An improved process as claimed in claim 1, wherein the stepwise increase in temperature helps overcome the need of using exogenous enzymes.

9. An improved process as claimed in claim 1, wherein incubating the said mixture in an oven.

10. An improved process as claimed in claim 1, wherein said process increases the nutrient value of the cereal malts.

* * * * *